(12) United States Patent
Thomas et al.

(10) Patent No.: US 6,723,761 B1
(45) Date of Patent: Apr. 20, 2004

(54) MICROCELLULAR FOAMING

(75) Inventors: David E. Thomas, Northbridge, MA (US); Jian Xing Li, Westborough, MA (US)

(73) Assignee: Bose Corporation, Framingham, MA (US)

( * ) Notice: Subject to any disclaimer, the term of this patent is extended or adjusted under 35 U.S.C. 154(b) by 1463 days.

(21) Appl. No.: 08/601,785

(22) Filed: Feb. 15, 1996

(51) Int. Cl.$^7$ ................................................. C08J 9/00
(52) U.S. Cl. ............................. 521/82; 521/78; 521/92; 521/182; 521/155
(58) Field of Search ............................. 521/182, 97, 82, 521/78

(56) References Cited

U.S. PATENT DOCUMENTS

| | | | | |
|---|---|---|---|---|
| 3,664,911 A | * | 5/1972 | Takabayashi | 521/135 |
| 4,129,697 A | * | 12/1978 | Schapel et al. | 521/125 |
| 4,256,198 A | * | 3/1981 | Kawakami et al. | 521/101 |
| 4,473,665 A | | 9/1984 | Martini-Vvedensky et al. | 521/79 |
| 5,158,986 A | | 10/1992 | Cha et al. | 521/82 |
| 5,340,846 A | * | 8/1994 | Rotter et al. | 521/182 |
| 5,360,829 A | * | 11/1994 | Kawabe et al. | 521/138 |
| 5,422,377 A | * | 6/1995 | Aubert | 521/155 |

OTHER PUBLICATIONS

Polyurethane Handbook–Chemistry–Raw Material–Processing–Properties–Hanson Publishers, New York, 1985 pp. 248–249.*

* cited by examiner

Primary Examiner—Morton Foelak
(74) Attorney, Agent, or Firm—Fish & Richardson P.C.

(57) ABSTRACT

A method for forming microcellular foams that causes the material to expand uniaxially during the foaming process, and a method for forming objects from the foam. Liquid crystal polymers or polymers having a planar crystalline structure are saturated with a fluid, normally a gas such as carbon dioxide. The ambient conditions are changed such that the fluid is in a supersaturated state, and the material is brought to near its glass transition temperature to induce the formation of nonspherical elongated gas-filled cells. A process for making objects, such as transducer diaphragms, from microcellular foams includes the step of forming the objects prior to the foaming process.

32 Claims, 4 Drawing Sheets

MICROCELLULAR FOAMING

The present invention relates to microcellular foams, and more particularly to the use of microcellular foams for uses such as transducer diaphragms.

Microcellular foams are made by supersaturating a polymeric material with a gas, heating the polymeric material to near its glass transition temperature, then cooling the material. This process causes the nucleation of small gas-filled voids, called cells, in the polymeric material, thereby causing the material to expand. Cooling the material causes expansion in the nucleation to stop. A method for manufacturing microcellular foam is described in U.S. Pat. No. 4,473,665 issued Sep. 25, 1984, to Martini-Vvedensky et al. Microcellular foams made by conventional processes have cell sized in the range of 2 to 25 microns.

Another class of microcellular foam is called supermicrocellular foam, which is made by supersaturating a polymeric material with a fluid in a supercritical state. Conventional supermicrocellular foam has cell sizes in the range of 0.1 to 2.0 microns. A method for manufacturing supermicrocellular foams is described in U.S. Pat. No. 5,158,986, issued Oct. 27, 1992 to Cha et al It is an important object of the invention to provide improved microcellular foams, transducer diaphragms and methods of making them.

According to the invention, a method for producing a foamed polymeric material includes saturating a portion of unfoamed material with a fluid; and causing the material to expand in thickness while remaining substantially unexpanded in its other dimensions.

An aspect of the invention, a method for forming a foamed polymeric object, includes the steps of preforming or shaping the object from an unfoamed polymeric material having a planar crystalline structure; saturating the object with a fluid; and reducing the ambient pressure to a pressure at which the material is supersaturated with the fluid.

In another aspect of the invention, a foamed polymeric material has gas filled cells each having one dimension that is larger than a second dimension.

In yet another aspect of the invention, a foamed polymeric material with gas filled voids having a first dimension of less than 30 microns measured in the direction of the thickness of the material forms a transducer diaphragm.

Other features, objects and advantages will become apparent from the following detailed description, which refer to the following drawings, in which like reference numerals refer to like elements in the several views.

Figure 1:
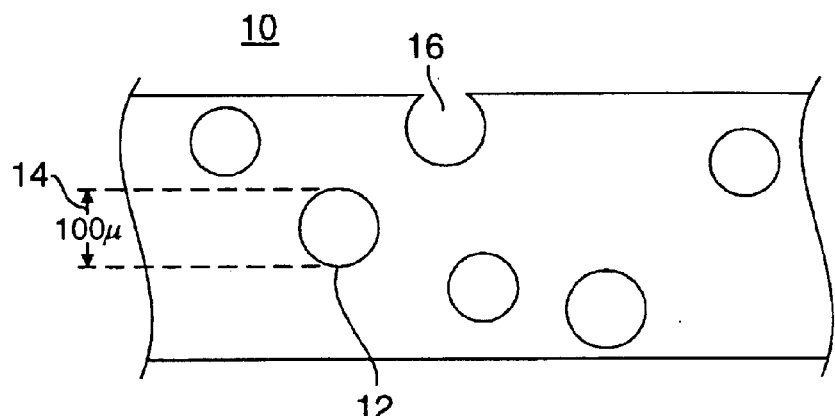
FIG. 1 is a cross section of a portion of a conventional foam.
Figure 3A:
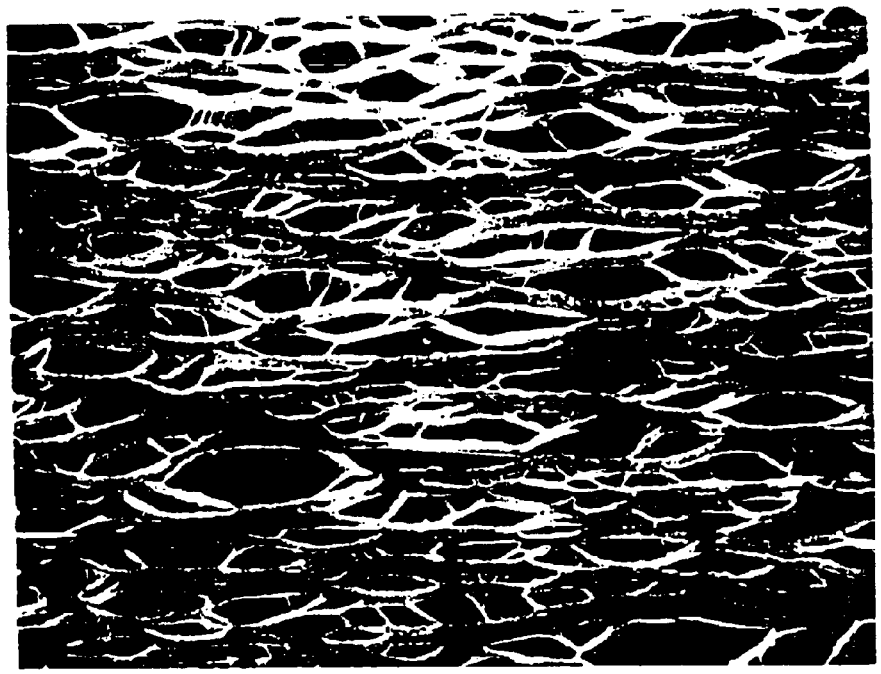
Figure 3B:
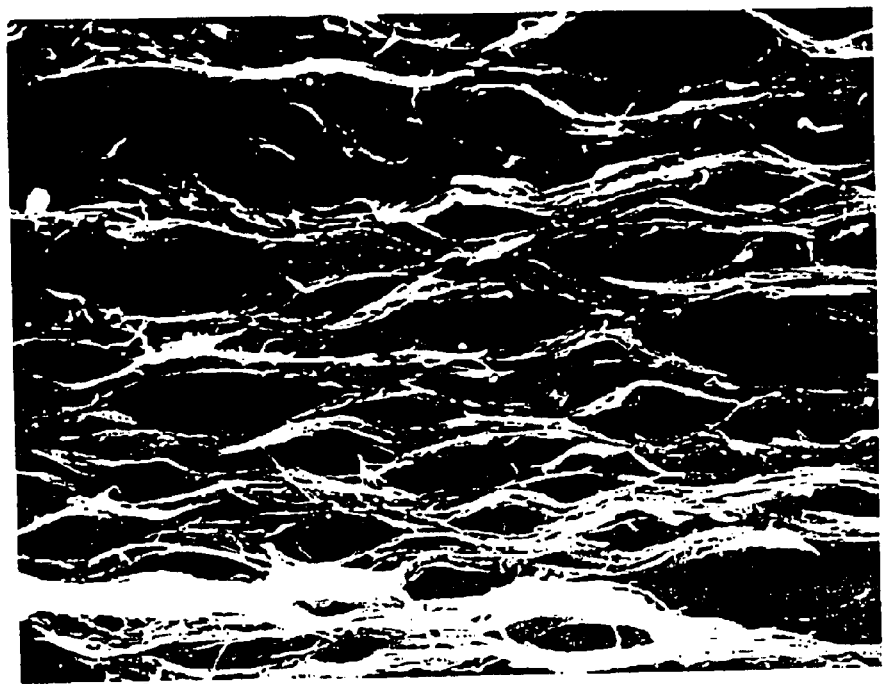
Figure 4:
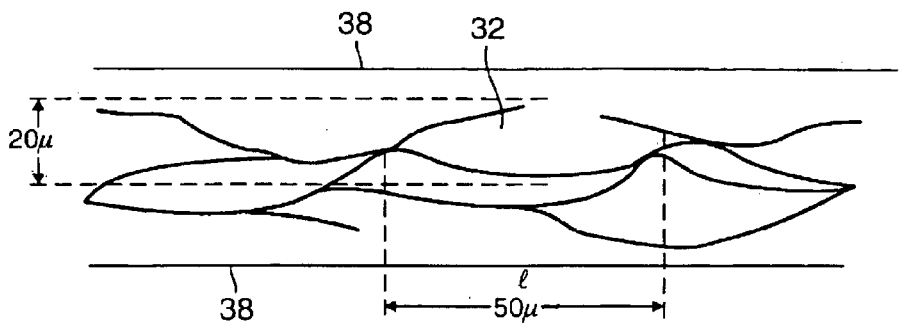
Figure 5:
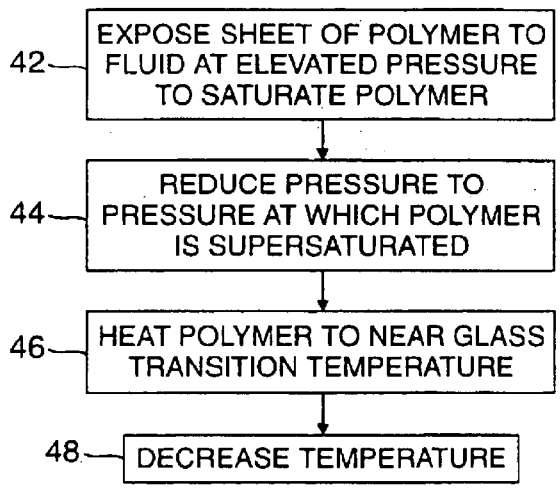
Figure 6:
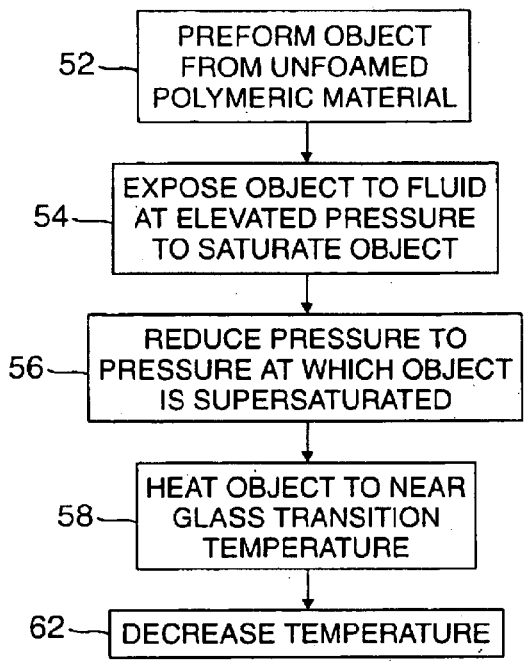
Figure 7:
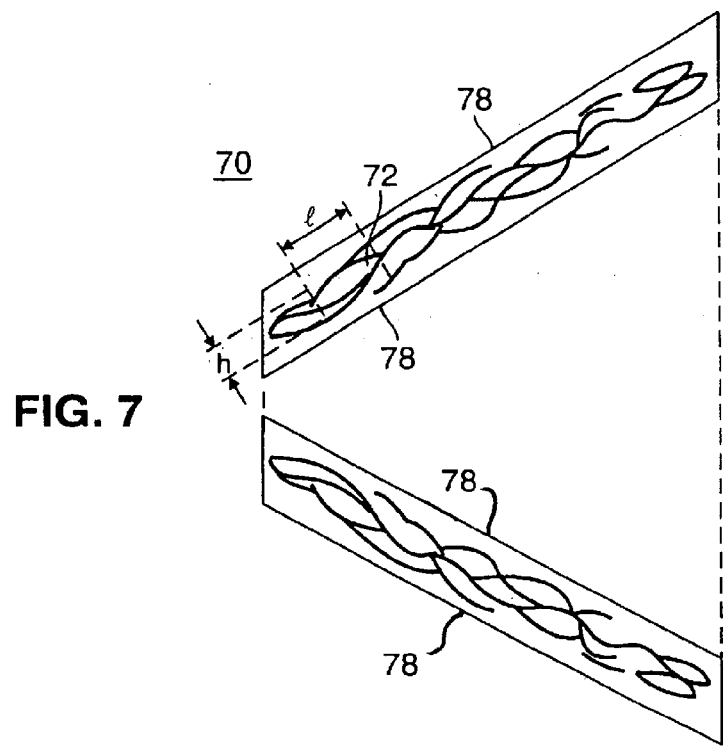

FIGS. 3a and 3b are semphotographs of sections of microcellular foam fabricated according to the principles of the invention FIG. 4 is a cross section of a portion of a microcellular foam fabricated according to the principles of the invention FIG. 5 is a flow diagram showing a process for fabricating microcellular foam according to the principles of the invention FIG. 6 is a flow diagram showing a process for fabricating microcellularly foamed object according to the principles of the invention FIG. 7 is a cross section of a transducer diaphragm according to the principles of the invention With reference now to the drawings and more particularly FIG. 1, there is shown a portion 10 of sheet of a conventional foam. Conventional foams are typically made of a matrix material such as polystyrene, polyvinyl chloride, or a phenol resin. Conventional foams have generally spherical cells 12 that have diameters 14 in the range of 100 microns or more. Additionally, conventional foams may have surface cells 16.

Figure 2:
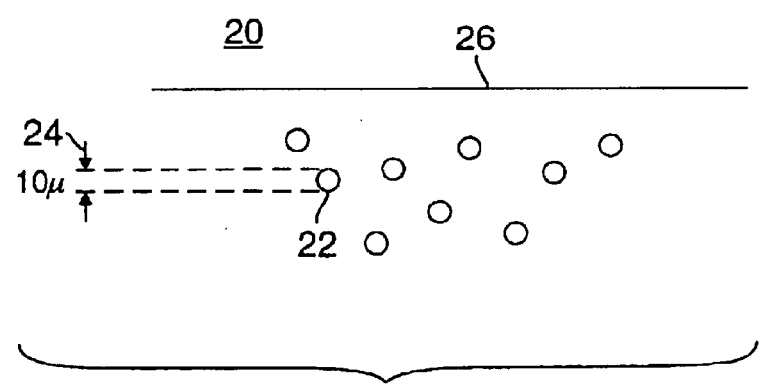
FIG. 2 is a cross section of a conventional microcellular foam

Referring to FIG. 2, there is shown a portion 20 of a sheet of conventional microcellular foam. The generally spherical cells 22 have a diameter 24 in the range of 0.1 to 25 microns, with a typical diameter of 10 microns. Additionally, the "skin" 26 of the microcellular foam material is essentially smooth, that is, free of cells.

Referring to FIGS. 3a and 3b, there are shown of microcellular foam produced according to the invention. In FIG. 3a, the material is polyethylene naphthalate. In FIG. 3b, the material is a liquid crystal polymer.

Referring to FIG. 4, there is shown a diagrammatic cross section of microcellular foam according to the invention helpful in understanding characteristics of the microcellular foam. The cells 32 are nonspherical, longer along the lengthwise axis than along the thickness axis. Typical dimensions may be 20 microns in height and 50 microns in length. The cells are local delaminations of a linear dimension on the order of 50 microns, with 20 microns of separation. As with the microcellular foam of FIG. 2, the "skin" area 38 is essentially smooth.

A microcellular foam, such as that shown in FIG. 3a and 3b may be produced by exposing under pressure a sheet of a polymer having a planar crystalline structure to a fluid until the material is essentially saturated with the fluid; reducing the ambient pressure to a pressure at which the material is supersaturated with the fluid; heating the material to near its glass transition temperature; and decreasing the temperature. Typically, the fluid is in the form of a gas, such as gaseous nitrogen or carbon dioxide, but may include fluids in other forms, such as supercritical fluids.

Referring to FIG. 5, there is shown a flow diagram of a process for manufacturing a microcellular foam according to the invention. The process may begin with the step 42 of exposing a sheet of a polymer having a planar crystalline structure to a fluid, typically a gas, at an elevated pressure to saturate the polymer. In one embodiment of the process, the polymer is polyethylene naphthalate approximately 127 microns thick, and the gas is carbon dioxide. A pressure of approximately 800 psi for 72 hours at room temperature is sufficient to achieve substantial saturation.

If the fluid is in a supercritical state, the process produces a supermicrocellular foam, with cells of similar geometry, but smaller dimensions, than with fluid below the supercritical state.

In step 44, the pressure may be reduced to a pressure at which the material becomes supersaturated; atmospheric pressure is typically sufficient. The material may then be heated in step 46 to near its glass transition temperature, for example, approximately 120° C. for 10 to 20 seconds for polyethylene naphthalate.

By using a polymer having a planar crystalline structure, an increase to near glass transition temperature at a pressure at which the fluid is supersaturated causes the formation of interplanar gas filled cells which have a non-spherical shape, in which the cells are longer along the axes parallel to the crystal structure than they are along the axis orthogonal to the plane of the crystal structure.

Next, in step 48 the temperature may be decreased to stop the formation of the gas filled cells. In one embodiment, air cooling the material at room temperature is sufficient.

Foaming by forming interplanar cells according to the invention causes the sheet of material to expand in thickness alone (that is orthogonal to the surface of the sheet) according to the invention but not in the width or length of the sheet (that is along the axes parallel to the surface of the sheet). This phenomenon avoids deformation during the foaming process which might occur with expansion in all directions. For parts with certain geometries, such as that of a transducer diaphragm, an increase in thickness without an increase in other dimensions allows a part to be foamed without distortion by maintaining its pre-foamed surface dimensions increasing only the thickness.

A feature of the invention is the use of microcellular foams for transducer diaphragms. One material, having a planar crystalline structure that is suited, in its microcellularly foamed form, for use as a transducer diaphragm, is polyethylene naphthalate, currently available commercially from ICI Films of Wilmington, Delaware, under the trade name "Kaladex®." Beginning with a film with a thickness of 127 microns, the microcellular foaming process of FIG. 5 can provide a film with a thickness of approximately 254 microns, which is suitable for use as a diaphragm.

Some mechanical characteristics of unfoamed polyethylene naphthalate and other diaphragm materials are summarized in Table 1.

TABLE 1

| Material | Speed of Sound (m/s) | Density (g/cm$^3$) | Plastic Modulus (GPa) |
|---|---|---|---|
| Polyethylene naphthalate | 2500 | 1.36 | 6.0 |
| Microcellular polyethylene naphthalate | 2300 | 0.68 | 3.6 |
| Paper (typical) | 2000 | 0.60 | 2.0 |
| Polypropylene | 1200 | 0.91 | 1.3 |
| PET | 1800 | 1.38 | 4.5 |
| Polycarbonate | 1400 | 1.20 | 2.4 |

While the speed of sound of unfoamed polyethylene naphthalate is comparable to paper, the density is high relative to paper, and it is significantly less suitable as a diaphragm material. Microcellularly foaming polyethylene naphthalate decreases density to that comparable to paper and significantly more useful as a transducer diaphragm material.

The advantageous property of retaining its shape surface linear dimensions during a foaming process according to the invention enables a part to be formed before or after the foaming process. Since the process according to the invention does not require heating to the melting temperature, the part may be performed by thermoforming sheet material prior to the foaming steps.

Referring to FIG. 6, there is shown a modification of the process of FIG. 5 which the object is formed before the foaming process. In step 52 the object, such as a transducer diaphragm, is formed from polymeric material, such as polyethylene napthalate in sheet form. In step 54, the object is exposed to fluid at an elevated pressure to saturate the object with the fluid. In step 56, the pressure may be reduced to a pressure at which the object is supersaturated with the fluid. In step 58, the object is heated to near the glass transition temperature of the material; if desired the object may be heated in a form to augment the shape retaining characteristic of the process. In step 62, the temperature may be decreased to stop the formation of the gas filled voids. Appropriate process parameters are similar to the process parameters stated in the discussion of FIG. 5. If the fluid of step 56 is in a supercritical state, the result is an object made of a supermicrocellular foam, with cell sizes of similar geometry, but smaller dimensions, than if the fluid is below a supercritical state.

Referring to FIG. 7, there is shown an axial sectional view of a transducer diaphragm 70 produced according to invention. Diaphragm 70 has elongated gas filled voids 72, each having one dimension 1 (measured along an axis 70 with the crystalline structure of the material) which is significantly greater than a second dimension h (measured along an axis orthogonal to the crystalline structure of the material). A typical size of the one dimension 1 is 50 microns, and a typical dimension for the second dimension h is 20 microns. The "skin" area 78 is essentially smooth, that is free of surface cells.

The invention having been described, those skilled in the art will recognize that the invention may be practiced in many ways other than those specifically described while remaining within the spirit and scope of the appended claims.

Other embodiments are within the following claims.

What is claimed is:

1. A method of producing a foamed polymeric material, comprising saturating a portion of unfoamed polymeric material having a thickness dimension transverse to opposed surfaces with a fluid; and expanding said unfoamed polymeric material in only said thickness dimension to form said foamed polymeric material with interplanar gas-filled cells in said material having a dimension in a direction parallel to said opposed surfaces treater than a dimension in a direction parallel to said thickness dimension.

2. The method as claimed in claim 1, wherein the only said material has a planar crystalline structure and wherein expanding said unfoamed polymeric material causes the formation of said interplanar gas-filled cells in said materials.

3. The method as claimed in claim 1, wherein the unfoamed polymeric material is polyethylene naphthalate.

4. The method as claimed in claim 2, wherein the gas filled cells have a substantially nonspherical shape.

5. The method as claimed in claim 4 wherein each of the gas-filled cells has at least one dimension in a direction parallel to said opposed surfaces that is significantly larger than at least one other dimension in a direction parallel to said thickness dimension.

6. The method as claimed in claim 5 wherein the at least one dimension is approximately 50 microns and the at least one other dimension is approximately 20 microns.

7. The method as claimed in claim 5 wherein the at least one dimension is more than two times the at least one other dimension.

8. The method as claimed in claim 1, wherein said saturating a portion is with a fluid in a supercritical state.

9. A method for forming a foamed polymeric object, comprising preforming the object from an unfoamed polymeric material having a planar crystalline structure;

saturating the preformed object with a fluid in an atmosphere at a predetermined ambient pressure; and reducing the ambient pressure to a pressure at which the preformed object is supersaturated with the fluid.

10. The method as claimed in claim 9, further comprising forming gas filled cells in said object each having at least one dimension that is significantly larger than at least one other dimension.

11. The method as claimed in claim 10, wherein the material comprises polyethylene naphthalate.

12. The method as claimed in claim 10, wherein the object comprises a transducer diaphragm.

13. The method as claimed in claim 9, wherein said saturating the preformed object is with the fluid in a supercritical state.

14. The method as claimed in claim 9, wherein the object has a thickness dimension transverse to opposed surfaces and further comprising expanding in said object only thickness dimension.

15. A foamed polymeric material, having a thickness dimension transverse to opposed surfaces comprising gas-filled cells each having one dimension in a direction that is parallel to said opposed surfaces that is larger than a second dimension in a direction parallel to said thickness dimension.

16. The material as claimed in claim 15, wherein the gas filled cells are formed by a process that comprises:

saturating an unfoamed polymeric material with a gas;

heating the unfoamed material to approximately its glass transition temperature; and reducing the ambient pressure to a pressure at which the unfoamed material is in an atmosphere having an ambient pressure supersaturated with the gas.

17. The material as claimed in claim 16, wherein the unfoamed polymeric material is polyethylene naphthalate.

18. The material as claimed in claim 15, wherein the one dimension is approximately 50 microns.

19. The material as claimed in claim 15, wherein the second dimension is approximately 20 microns.

20. The material as claimed in claim 15, wherein the one first dimension is more than twice the second dimension.

21. A foamed polymeric object, formed by:

shaping the object from an unfoamed polymeric material having a planar crystalline structure;

saturating the shaped object with a fluid in an atmosphere having an ambient pressure; and reducing the ambient pressure to a pressure at which the shaped object is supersaturated with the fluid.

22. The object as claimed in claim 21, wherein reducing the ambient pressure step causes the shaped object to locally delaminate.

23. The object as claimed in claim 22, wherein the polymeric material comprises polyethylene naphthalate.

24. The object as claimed in claim 21, wherein the object comprises a transducer diaphragm.

25. A diaphragm comprising, a foamed polymeric material having a thickness transverse to opposed surfaces having gas-filled voids between the opposed surfaces, the voids having a first dimension of less than 30 microns measured in the direction of said thickness and a second dimension greater than said first dimension in a direction parallel to said opposed surfaces.

26. A loudspeaker diaphragm as claimed in claim 25, wherein the polymeric material has a planar crystalline structure in a preformed state.

27. A loudspeaker diaphragm as claimed in claim 26, wherein the voids are interplanar between said opposed surfaces.

28. A loudspeaker diaphragm as claimed in claim 26, wherein the polymeric material comprises polyethylene naphthalate.

29. A loudspeaker diaphragm as claimed in claim 25, wherein the diaphragm is self-skinned.

30. A loudspeaker diaphragm as claimed in claim 25, wherein said second dimension is significantly larger than the first dimension.

31. A diaphragm as claimed in claim 30, wherein the second dimension is more than two times the first dimension.

32. A diaphragm as claimed in claim 30 wherein the second dimension is approximately 50 microns.

* * * * *

UNITED STATES PATENT AND TRADEMARK OFFICE
CERTIFICATE OF CORRECTION

PATENT NO. : 6,723,761 B1
DATED : April 20, 2004
INVENTOR(S) : Norman Adams Schneider, David E. Thomas and Jian Xing Li It is certified that error appears in the above-identified patent and that said Letters Patent is hereby corrected as shown below:

<u>Column 4,</u>
Line 29, "treater" should be -- greater --.

Signed and Sealed this

Twenty-ninth Day of November, 2005

JON W. DUDAS
*Director of the United States Patent and Trademark Office*